Figure 1:
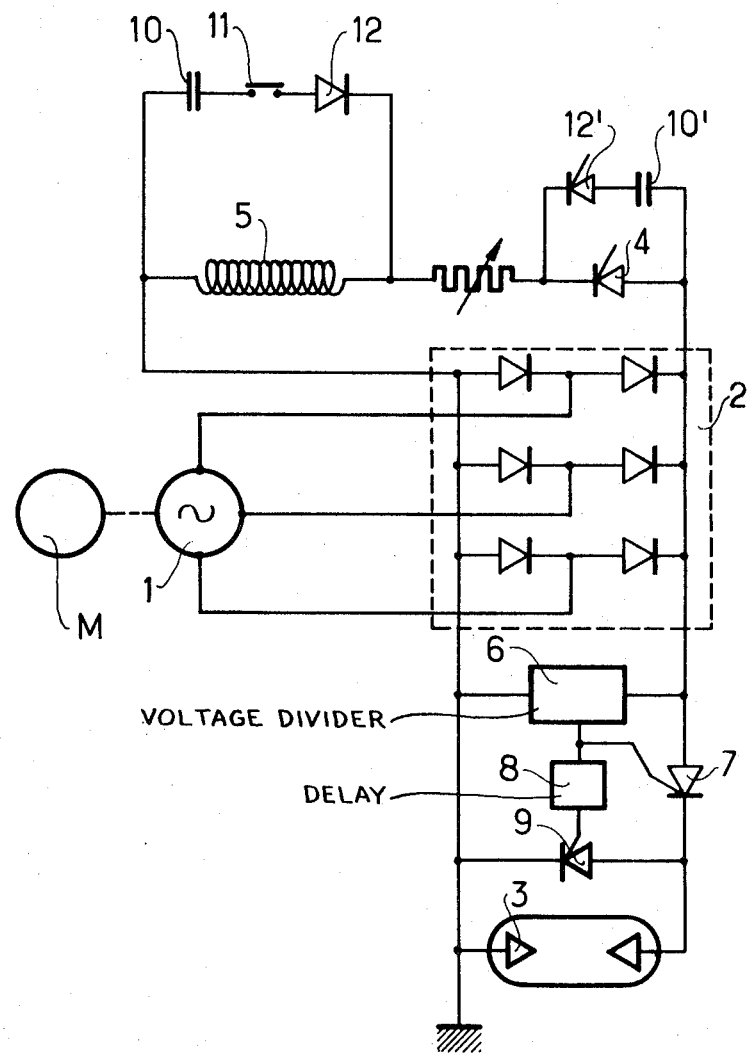

United States Patent

[11] 3,621,368

[72] Inventor Andre Jules
 Sartrouville, France
[21] Appl. No. 16,884
[22] Filed Mar. 5, 1970
[45] Patented Nov. 16, 1971
[73] Assignee Compagnie Generale D'Electricite
 Paris, France
[32] Priority Mar. 6, 1969
[33] France
[31] 6906149

[54] APPARATUS FOR OBTAINING AN ELECTRIC DISCHARGE IN A CONDUCTIVE LIQUID MEDIUM, MORE PARTICULARLY FOR ELECTRIC SEA FISHING
 7 Claims, 11 Drawing Figs.
[52] U.S. Cl. .................................. 322/18,
 43/17, 310/198, 321/28, 322/73, 322/90
[51] Int. Cl. .................................. H02p 13/16,
 H02k 3/00, H02m 7/08

[50] Field of Search .................................. 43/17.1;
 321/5, 9, 27, 28; 322/18, 73, 90; 310/198

[56] References Cited
 UNITED STATES PATENTS
| | | | |
|---|---|---|---|
| 2,666,492 | 1/1954 | Nims et al. | 322/90 UX |
| 3,229,187 | 1/1966 | Jensen | 321/27 X |
| 3,340,448 | 9/1967 | Thiessen | 321/27 X |
| 3,350,626 | 10/1967 | Mosier | 322/73 |
| 3,430,123 | 2/1969 | Correy et al. | 331/5 X |
| 3,496,414 | 2/1970 | Logston | 322/90 X |

Primary Examiner—William H. Beha, Jr.
Attorney—Sughrue, Rothwell, Mion, Zinn and Macpeak ABSTRACT: Apparatus for obtaining an electrical discharge in a conducting liquid medium, particularly for electrical sea fishing. A rotating pulse generator connected to the drive shaft of a vessel is connected to electrodes immersed in a liquid by a double star and delta connected rectifying device.

APPARATUS FOR OBTAINING AN ELECTRIC DISCHARGE IN A CONDUCTIVE LIQUID MEDIUM, MORE PARTICULARLY FOR ELECTRIC SEA FISHING

The present invention concerns apparatus for producing electric high-energy pulses in a low-impedance load.

More particularly, this invention concerns the case where the low-impedance load consists of electrodes immersed in an electrically conductive medium, for example such as sea water.

In accordance with another aspect, the present invention concerns apparatus for fishing in sea water by electronarcosis of the fish with the aid of electric pulses applied between electrodes immersed in the water.

The present invention also concerns apparatus for the production of acoustic or light waves in a conductive liquid medium, the said acoustic or light waves serving for oceanographic or seismic research and being produced by the striking of an electric arc between two electrodes immersed in the said conductive liquid medium.

The production of electric discharges through a disruptive load whose initial impedance is high has hitherto been effected by discharging banks of capacitors.

The use of banks of capacitors has proved to be a method attended by many disadvantages, such as high weight, large overall dimensions, low reliability, equipment of delicate construction, necessity for frequent replacement of costly parts, and the like.

The applicants have developed a particular pulse alternator associated with a rectifying and control circuit, which is described in French Pat. No. 1,538,346, applied for on the 31st Mar., 1967, under the title "APPARATUS FOR FEEDING AN ELECTRONIC FLASH GENERATOR." The apparatus described in the said patent is suitable for supplying pulses to certain disruptive loads such as, for example, discharge tubes of the flash type. By "disruptive load" is meant a load having a very high initial impedance which suddenly falls to a low but constant value, either under the action of an appropriate control device (such as devices for firing spark gaps having a dielectric medium) or under the action of the voltage which is itself applied when the latter exceeds a certain threshold value.

The present invention relates to a new apparatus which is capable of producing electric discharges of very high energy in a load which may have a very low normal impedance.

The present invention also concerns an electric installation for provision on a ship, which is intended to produce electric discharges of very high energy in a load consisting of electrodes which are mechanically and electrically connected to the said ship and which are immersed in the liquid medium on which this ship is borne.

This invention also concerns a novel industrial product for salt water fishing.

The installation for the production of electric pulses according to the invention has many advantages. This installation makes it possible to obtain electric discharges between two electrodes immersed in an electrically conductive liquid, these discharges resulting either in a sudden application of a very high voltage between these electrodes or in the sudden passage of an electric arc through this medium, which results could not be obtained with the same effectiveness by the known apparatus. The installation according to the invention comprises only conventional components which are reliable, of low cost, relatively light and of relatively small overall dimensions. This installation is capable of supplying at a very high rate very brief energy pulses and has the immense advantage of being supplied with energy directly by the kinetic energy of a rotating electric machine (alternator) driven by the propulsion unit of the vehicle or ship on which it is installed without any intermediate device for the storage or conversion of energy which would have the effect of reducing the overall output and of increasing the weight and the dimensions of the installation.

Figure 2:
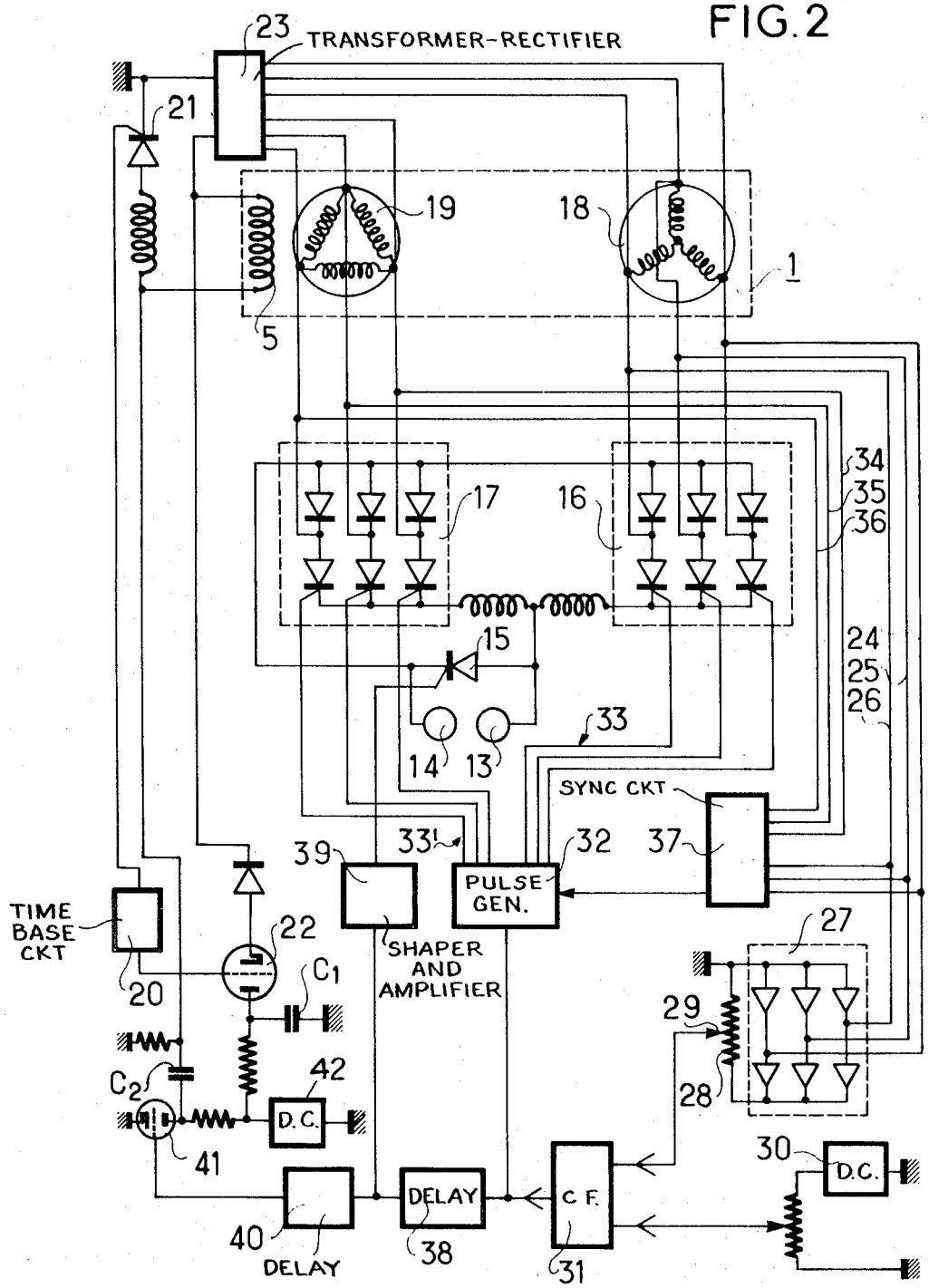
Figure 3A:
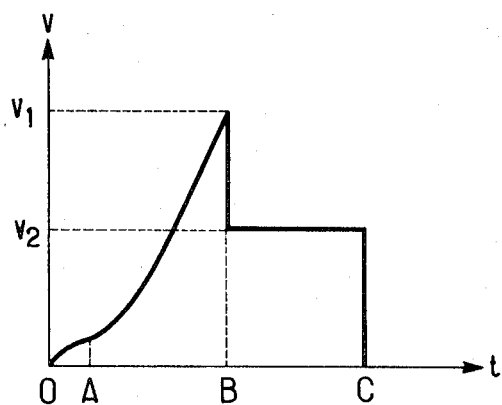
Figure 3B:
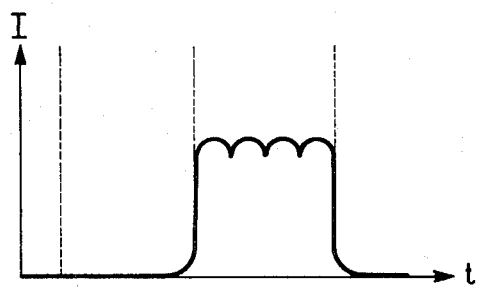
Figure 3C:
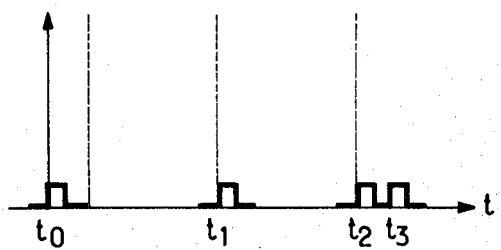
Figure 4A:
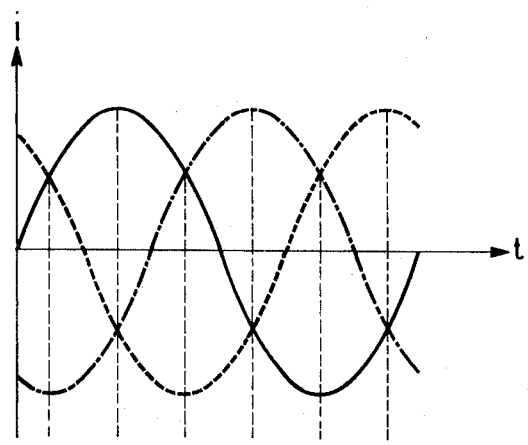
Figure 4B:
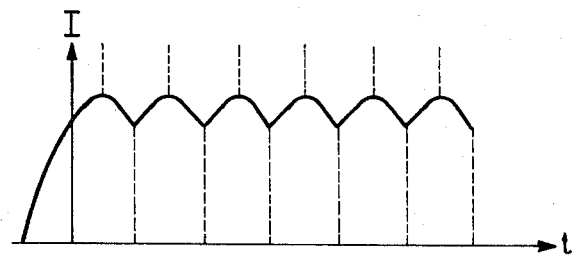
Figure 4C:
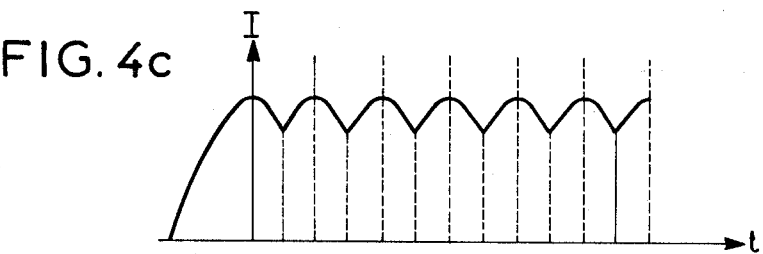
Figure 4D:
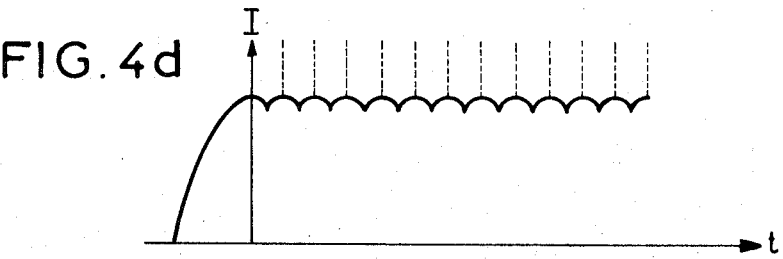
Figure 5:
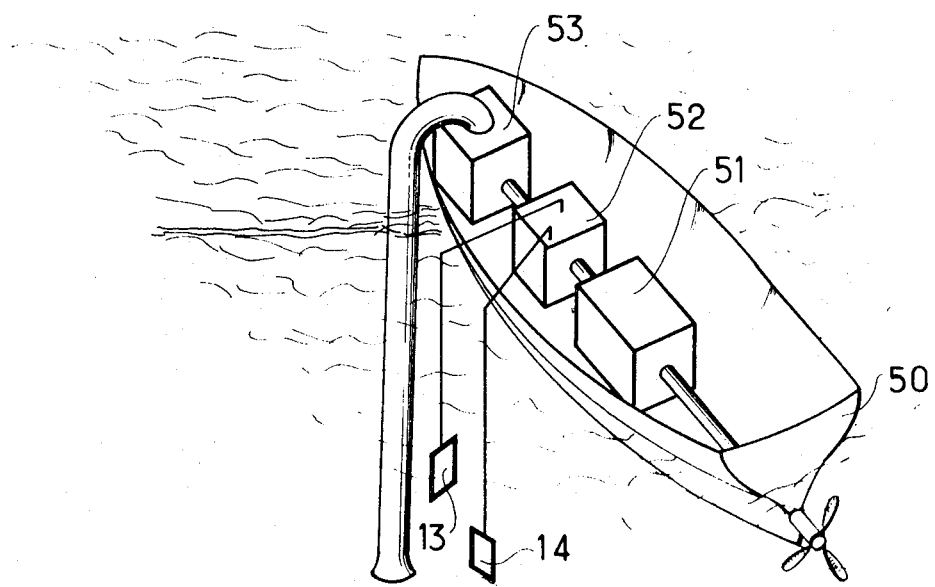
Figure 6:
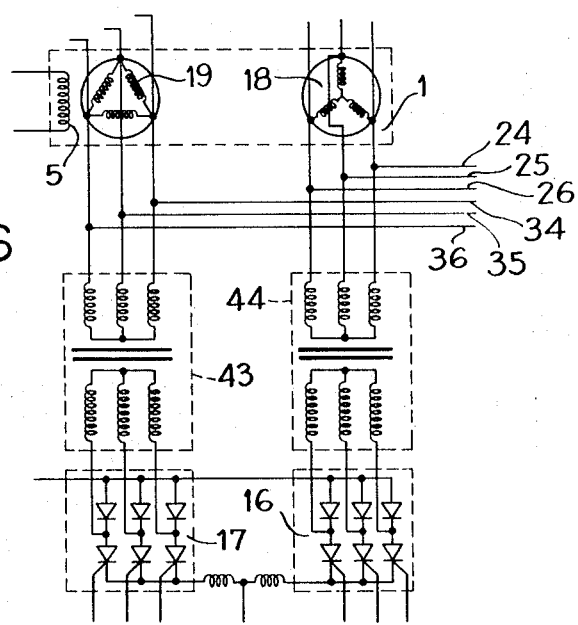

Further features and advantages of the present invention will become apparent in the course of the following detailed description, in which reference is made to the accompanying drawings, which are given as examples having no limiting character, and in which:

FIG. 1 shows the circuit diagram of the apparatus described in the aforesaid patent, FIG. 2 is a circuit diagram of a particular form of construction of the installation according to the invention, FIGS. 3a, 3b and 3c are curves illustrating the form of the electric energy pulses supplied by the installation according to the invention, FIGS. 4a, 4b, 4c and 4d are curves illustrating the operation of the rectifier bridges employed in the installation according to FIG. 2, and FIG. 5 diagrammatically illustrates the complete installation mounted on a fishing boat, FIG. 6 shows a modification of FIG. 2.

FIG. 1 illustrates the circuit of a pulse alternator employed in accordance with French Pat. No. 1,538,346 to feed disruptive loads, that is to say loads such as vacuum electron tubes, gas electron tubes, flash tubes, gas discharge tubes or spark gaps having electrodes disposed in a solid or liquid dielectric medium.

The circuit according to FIG. 1 comprises a motor M which drives an alternator 1 which feeds into a rectifier bridge 2. A disruptive load consisting of an electronic flash generator 3 is connected to the output terminals of the rectifier bridge 2. The alternator comprises an exciter winding 5 provided with a starting circuit comprising a capacitor 10, a switch 11 and a rectifier 12 which are connected in series between the terminals of the exciter winding 5. The alternator comprises a self-exciting circuit, the exciter winding 5 being supplied with direct current through a controlled-conduction rectifier 4 by the rectifier bridge 2. A series circuit comprising a capacitor 10' and a controlled-conduction rectifier 12' is connected in parallel with the rectifier 4. This circuit is adapted to bias inversely the rectifier 4 and thus to enable the alternator to be deenergized when necessary. A voltage-measuring circuit 6 connects the output terminals of the rectifier bridge 2; the circuit 6 is capable of supplying a control pulse to the trigger of a controlled rectifier 7 which is connected in series with the load 3. A delay device 8 transmits this pulse to the trigger of another controlled rectifier 9 which is connected in parallel with the load 3.

The circuit according to FIG. 1 operates as follows:

The alternator is started on closing of the switch 11 of the starting circuit associated with the winding 5, by discharge of the previously discharged capacitor 10. The rectified voltage at the output of the rectifier bridge 2 increases and produces the self-starting of the alternator through the rectifier 4, which is rendered conductive when the switch of the starting circuit is closed. The voltage across the output terminals of the rectifier bridge increases and reaches the threshold value of the circuit 6, which then supplies a turn-on signal to the controlled rectifier 7, which results in the firing of the flash generator.

The output signal of the circuit 6 also renders the rectifier 9 conductive through the delay device 8, which has the effect of short-circuiting the load 3 and therefore of determining the duration of the discharge pulse passing through 3.

The above-described apparatus does not permit of appropriately resolving certain problems arising in the use of electrodes disposed in a conductive liquid medium such as sea water.

It is known that, in order to obtain the self-starting of the alternator, it is necessary for the impedance of the load, as seen from the armature winding, to be high. In the case of the circuit for supplying a disruptive load according to FIG. 1, a noncontrollable rectifier bridge is employed; this does not present any disadvantage, because as long as the flash generator is not fired, its impedance, as seen from the alternator through the said bridge, is infinite and the alternator can self-start. In the case of electrodes disposed in conductive water, for example sea water, the charge seen through this bridge has a very low constant impedance, which prevents the self-starting.

In the circuit illustrated in FIG. 1, the series thyristor 7 connected in the circuit products for the output side of the rectifier bridge 2 only performs the function of a safety device for preventing untimely firing of the flash generator, the state of ionization of which may be random, especially when it is necessary to operate at relatively high rates. In the case of paralyzed immersed in a conductive liquid, the thyristor 7 then becomes a necessary and no longer accessory element, but it does not make it possible to obviate completely the disadvantages due to the conductivity of the medium in which the electrodes are disposed, because after the short-circuiting of the load, the voltage across the terminals of the thyristor 7 does not fall sufficiently to obtain reliable deenergization at each cycle, especially when it is necessary to operate the apparatus at a high rate.

The circuit according to the present invention is distinguished essentially from the known circuit by the fact that it comprises a three-phase pulse generator having armature windings connected in star and in delta respectively to two controllable rectifier bridges which are connected in parallel with the load, which also comprises in parallel a controllable short circuit rectifier.

In accordance with another feature of the circuit according to the invention, the exciter winding of the alternator is connected, not to the output of the said rectifier units, but to the output of the armature windings of the alternator through a transformer-rectifier set connected in series with a thyristor.

In accordance with another feature of the invention, the circuit comprises a voltage-measuring device connected to the terminals of the armature of the alternator, in association with a comparator which supplies a signal for rendering the said rectifier bridges conductive when the voltage on the input side of the said bridges exceeds a predetermined reference value.

In accordance with another feature of the invention, the circuit comprises means which are capable of transmitting the control signal of the said comparator with a predetermined delay to an electronic switch controlling the excitation circuit of the said alternator.

FIG. 2 illustrates an example of a circuit according to the present invention.

This circuit comprises an alternator diagrammatically represented by the unit 1 and comprising star-connected armature windings 18, delta-connected armature windings 19 and an exciter winding 5.

The output of the star connection 18 is connected to a load, diagrammatically represented by electrodes 13 and 14, through a rectifier bridge 16 comprising controlled-conduction rectifiers. Likewise, the output of the delta connection 19 is connected to the load 13–14 through a rectifier bridge 17 comprising controlled-conduction rectifiers. A controlled-conduction rectifier 15 is connected in parallel with the load.

A voltage-measuring circuit connected by the conductors 24, 25 and 26 to the output of one of the armature branches (for example the star branch 18) comprises a measuring rectifier bridge 27 whose output is connected to a load 28 having a relatively high resistance, which operates as a voltage divider owing to the provision of an adjustable tap 29. This tap is connected to one of the inputs of a comparator 31, the other input of which is connected to a reference voltage source 30. The comparator 31 is a circuit which is capable of supplying a voltage pulse of appropriate duration when the voltage measured across the terminals of the armature of the alternator exceeds a preset value.

The output of the comparator 31 is connected to the actuating input of an amplifier which generates signals for triggering the controlled rectifiers of the bridges 16 and 17. These signals are synchronized with the voltage of the phases at the armature windings of the alternator through a conventional synchronizing circuit connected to the phases by conductors such as 24, 25, 26, 34, 35 and 36, for example. On the other hand, the output of the comparator 31 is connected through a variable-delay circuit 38 to the input of a pulse-shaping amplifier 39 whose output is connected to the trigger of the thyristor 15 connected in parallel with the load 13–14.

The output of the delay circuit 38 is connected through another delay circuit 40 to the grid of a thyratron 41 inserted in the deenergization control circuit of the winding 5. This winding is supplied on a self-excitation basis by a transformer-rectifier set 23 whose input is connected to the terminals of the two star and delta connections 17 and 18.

The winding 5 is fed through a thyristor 21 connected in series with a self-inductance, which thyristor is adapted to be rendered conductive by a control signal applied to its trigger by a signal generator (time-base circuit 20) and rendered nonconductive by an inverse current pulse applied by a capacitor C2, the discharge of which is controlled by the thyratron 41.

In addition, the winding 5 is provided with a pre-exitation circuit comprising, connected in series, a thyratron 22 controlled by the aforesaid signal generator 20, a diode and a capacitor C1 adapted to be charged by a DC or unidirectional-voltage source 42 connected to the anode of the thyratron 41.

The circuit according to FIG. 2 operates as follows:

The time base circuit 20 supplies a pulse (time to, FIG. 3c) which renders conductive the series thyristor 21 connected in the excitation circuit, and a thyratron 22. The said thyratron 22 produces the discharge of the capacitor C1 into the excitation circuit, thus creating the preexcitation of the alternator, csrresponding to the portion OA of the curve of FIG. 3a, which represents the variation of the rectified voltage at the output of the alternator. The voltage of the machine increases and the alternator is self-started (portion AB of FIG. 3b) through the transformer-rectifier 23 which feeds into the exciter winding. The conductors 24, 25 and 26 transmit the voltage of the machine to the measuring rectifier 27, the output of which is connected to the resistor 28. The voltage tapped from the point 29 is compared with a reference voltage supplied by a DC or unidirectional-voltage source 30, with the aid of the comparator 31, which supplies a pulse which sets in operation a pulse generator 32 (time $t_1$, FIG. 3c). The said pulse generator 32 sends pulses through the lines 33 and 34 to fire the thyristors of the bridges 16 and 17. These firing pulses are synchronized with the voltage supplied by the armature through the lines 24, 25, 26, 34, 35 and 36 connected to the switching synchronizing circuit 37.

The rectifier bridges thus being rendered conductive, the electrodes 13 and 14 are supplied with an appropriate voltage.

At the end of a certain time ($t_2$, FIG. 3c) determined by the variable-delay device 38, the pulse supplied by the comparator 31 is transmitted through the amplifier 39 to the trigger of the thyristor 15, which short circuits the electrodes.

This same pulse supplied by the comparator 31 is thereafter transmitted by the variable-delay device 40 (time $t_3$, FIG. 3c) to the control electrode of the switch 41 formed, for example, of a thyristor or a thyratron. The closing of this switch 41 results in the discharge of the capacitor C2, which renders the thyristor 21 nonconductive and thus cuts off the excitation circuit. At this instant, the cycle is completed and a further pulse supplied by the time-base circuit 20 will cause it to be repeated.

The circuit according to FIG. 2 has many advantages.

The use of a controllable rectifier makes it possible to obviate the disadvantages due to the uncertain character of the turnoff of the thyristor connected in series with the load and operating with direct current.

In each arm of the bridge, the voltage periodically passes through zero, thereby rendering very certain the turnoff of the thyristors, because the period between two passages through zero of the alternating current is distinctly shorter than the time elapsing between two periods of operation of the controllable rectifier 15 which short circuits the load. In the circuit according to FIG. 1, the measurement of the voltage intended to determine the instant when the thyristor 7 is to be turned on is effected by a voltage divider 6 disposed between the rectifier bridge 2, which is always in the conductive state, and the thyristor 7. This voltage divider 6 disposed between the output terminals of the rectifier bridge 2 is therefore always supplied with voltage and the electronic control circuit always has an energy source for applying a turn-on pulse to the thyristor 7.

In the case of the circuit according to FIG. 2, which is adapted to a load formed of electrodes disposed in a conductive medium, the rectifier bridge 16–17 being controllable and rendered nonconductive by the firing of the short circuit thyristor, there is no voltage on the output side of this bridge, and the signal by which the bridge is rendered conductive for the succeeding charge is therefore taken from the input side of the rectifier bridge, i.e. from the terminals of the star-connected and delta-connected armature windings.

When it is desired to feed a load formed of two electrodes disposed in salt or fresh water, it is necessary, for the electronarcosis of the fish, to produce pulses which have, on the one hand, very steep positive-going and negative-going edges, and on the other hand a continuous part which is only slightly modulated. The reduction of the modulation of these pulses may be effected by self-inductances (cumbersome and costly elements), which leave ripples. In accordance with the present invention, these ripples are further reduced by the use of two rectifier bridges, one of which is fed by a delta-connected source and the other by a star-connected source, with identical voltages.

In FIG. 4a, there are shown the curves of the three voltages obtained at the output of the delta arrangement. After rectification, there is obtained a signal in which each period comprises six ripples out of phase by 60° (FIG. 4b). The output signal of a star-connected rectifier bridge also has six ripples out of phase by 60° in each cycle, but these six ripples (FIG. 4c) are out of phase by 30° in relation to the six ripples obtained at the output of the delta-connected rectifier bridge. By connecting the two rectifier bridges in parallel, there is therefore obtained in accordance with the invention a signal which is completely suitable for the requirements in regard to the production of the electronarcosis, i.e. a signal having a modulation of twelve oscillations per cycle (FIG. 4d).

The use of two parallel-connected rectifier bridges as described in the foregoing also has the advantage that it increases the number of rectifiers employed and therefore decreases the load on each of these rectifiers.

The use of rectifiers designed for a lower rated power and operating with alternating current reduces the cost of the installation and permits a more reliable and more rapid switching.

As stated in the foregoing, many variants may be made in the application of the invention, and more particularly it is possible to connect the measuring rectifier bridge 27 to the delta-connected armature circuit instead of the star-connected armature circuit. On the other hand, in the case of the use of sparkers intended to produce, not a single-field pulse, but an electric arc in a conductive medium, it is necessary to have available a notably higher voltage. In this case, it may be useful to employ voltage step-up devices or transformmers 43 and 44 (FIG. 6) connected on the input side of the rectifier bridges. In the latter case, the characteristics of the voltage must not be exactly the same as for electric fishing, but the circuit, as previously described, may undergo various modifications and adjustment, taking into account the characteristics which must be obtained for the electric arc, the characteristics of the electrodes employed and the characteristics of the conductive liquid medium, these adjustments and modifications of characteristics not only being rendered possible, but being facilitated by the use of a pulse generator in the form of a rotating machine.

The above-described assembly has many advantages due to the high reliability of the components employed, great simplicity of the circuit, which is of small overall dimensions, and a reduced volume and high flexibility of adjustment.

In order to obtain a high average output power, it is important that the pulse alternator employed should have very high inertia. In addition, its time constant must be as small as possible in order to obtain square pulses even when they are of short duration. In order to obtain high peak powers, it is also desirable for the alternator to have very low magnetic leakages, very low armature reaction and very low reactance.

The apparatus according to the invention makes it possible to obtain across the terminals of the electrodes a voltage which is adjustable in the range from 300 to 400 v. and a current output of 3,400 to 4,600 amperes with a pulse duration of the order of 1 to 2 ms., at a repetition rate of 10 to 20 c./s. This repetition rate may also be equal to 50 c./s. for a pulse duration of 1 ms., with a time of rise of 0.2 ms.

On the basis of these data, the maximum useful power will therefore be equal to $400 \times 4,600 \times 10^{13} \times 50 = 92,000$ w., i.e. 92 kw.

The speed must be as high as possible, but it must remain compatible with the centrifugal forces. The choice of a very high speed of rotation for the alternator may involve the use of a mechanical multiplier interposed between the alternator and the driving unit. However, the speed must not be too high, because this would increase the cost of the assembly and would cancel out some of the advantages of the apparatus. Having regard to these various considerations, the applicants have chosen a speed of 3,000 r.p.m. for the alternator.

A flywheel of the type possessed by the existing alternator has at 3,000 r.p.m. a kinetic energy of the order of 700 kj. In the least favorable case, i.e. with 50 pulses per second of 1 ms., the lowering of the energy of the rotor would be 92 kj., resulting in a slip of:

$$\frac{\Delta n}{n^n} = \frac{1}{2} \times \frac{\Delta W}{W} = \frac{1}{2} \times \frac{92}{700} = 0.066$$

i.e. a slip of 6.6 percent, which must readily correspond to the driving unit.

The choice of a large number of poles also makes it possible to reduce the weight of the alternator, to reduce the time constants and also to make the armature reaction ampere-turns substantially equal to the magnetizing ampere-turns so as to reduce the armature reaction. As a practical example, the number of poles may be equal to 24, giving a frequency of 600 c./s. at 300 r.p.m.

In order to minimize the leakages of the inductors, the height of the pole pieces is reduced to the minimum compatible with the evacuation of the losses. The magnet wheel therefore has the appearance of an annular ring having slightly salient poles. By way of example, there may be constructed a rotor in which the pole cores have a height equal to 15 mm. and the pole pieces have a height of 5 mm. with an armature diameter of 575 mm.

Likewise, the depth of the stator slots is small and equal to 15 mm.

The other electric characteristics of the alternator according to the invention may be given by way of example:

internal impedance per phase of the alternator at 600 c./s. $Z=0.02\Omega$ resistance per phase, $R_{int} = 0.001\Omega$ angular frequency $= 2\pi f = 2\pi \times 600 = 3,750$ Total resistance per phase in the alternator:

$$R' = R_{int} + 0.43 \times R_{ext},$$

here $R_{ext} = 0.088\Omega$
$R' = 0.001 \times 0.43 \times 0.088 = 0.039\Omega$ time constant of the establishment of the effect on the output impedance:

$$\frac{L}{R'} = \frac{Z}{R'\omega} = \frac{0.02}{0.039 \times 3,750} = 0.137 \text{ ms}$$

As mentioned in the foregoing, another aspect of the present invention concerns a novel industrial products for electric fishing, consisting of the combination, on a vessel, of a pulse alternator whose output is connected to electrodes disposed in the sea, and of a pumping set provided with a suction tube immersed in the sea in order to collect the fish whose escape reflexes have been paralyzed by the electric pulses produced by the said electrodes, characterized in that the said alternator and the said pumping set are driven by a single-driving unit consisting of the propulsion unit of the said vessel.

In accordance with the present invention, as diagrammatically illustrated in FIG. 5, the pulse alternator installed on a boat 50 is in the form of a rotating set 52 mounted on a frame. The diesel set 51 by which the boat is driven is provided with a speed multiplier (not shown) having a ratio of 800:3,000 r.p.m., for example, and an elastic coupling associated with the pulse alternator.

The energy on board the craft is supplied by the shaft of the diesel engine, which will be disconnected from the screw. This diesel engine has a power of 300 horsepower, i.e. 20 available kw., at 800 r.p.m. (during the fishing period, the vessel is stopped, and there is therefore no difficulty in decoupling the screw from the engine).

Having regard to the characteristics of the available diesel engine, and assuming an output of 60 percent of the pulse generator, there is no problem in obtaining pulses of 3 m. sec. at a rate of 10 shots per sec. in the least favorable case.

$$3 \times 10^{-3} \times 10 \times 400v. \times 4600A. \times \frac{100}{60} = 92 \ kw.$$

for an available power of 220 kw.

In order to utilize all the available energy of the engine, it is possible to supply pulses of 1.4 m.sec. at a rate of 50 shots per second.

The direct employment of the kinetic energy accumulated in the driving unit of the boat for driving the pulse alternator is an important feature which clearly distinguishes the apparatus according to the invention from any other apparatus, in which the primary energy which is continuously supplied by the driving engine is stored in any manner in order to be released in the form of pulses at the required time, as is the case, for example, with an electric generator set feeding a bank of capacitors. In the latter case, it is the bank of capacitors which produces the pulse, while in the case of the present invention the primary energy is supplied directly in pulse form, utilizing the direct conversion of the energy stored in the form of kinetic energy of rotation of the set.

This feature has many advantages, because it makes it possible to avoid the use of any motor other than the driving unit (saving of weight and space), to avoid any intermediate conversion of energy (elimination of losses) and above all to utilize the kinetic energy of the assembly in optimum manner.

As stated in the foregoing, the energy of the electric pulses supplied by the pulse alternator is a function of the kinetic energy of the rotor, which energy cannot be considerably increased owing to considerations of weight, strength of materials, and so on. In the present case, the use of a flywheel may be avoided, because the diesel set and the mechanical transmission system of the propulsion system of the boat can store kinetic energy.

From another viewpoint, the use of a flywheel in association with the propulsion set may afford advantages in the propulsion itself when the alternator is decoupled and even operating under no load. It is to be noted that electric fishing is employed when the boat is stopped and vice versa, which thus affords an optimum and rational utilization of the propulsion set.

In accordance with another feature of the invention, the above-described assembly is associated with a sea water pumping set 53. The driving of the pumping set by the same propulsion set produces the same advantages as have been described in the foregoing and makes it possible to increase further the energy yield of the whole installation provided on board the boat.

The use of a pulse alternator for electric fishing therefore affords not only an increase in this energy yield, but also the possibility of resolving, with an appropriate electric circuit, the problem of producing electric pulses having appropriate characteristics which can readily be modified in accordance with the requirements. Such a combination of features cannot be obtained, either with the same quality (positive-going edge, repetition rate, intensity, etc.) or with the same yield, by known apparatus such as those in which banks of capacitors or delay lines are employed.

It is specified that the invention is not limited to the particular embodiment which has just been described, but that it includes all possible variants conforming to the general definition which has been given of the apparatus.

I claim:

1. In apparatus for producing a brief electric discharge in a load of low impedance connected to the terminals of the armature winding of a three-phase pulse alternator through a rectifying and pulse-forming circuit associated with a control circuit, the improvement wherein said rectifying circuit comprises a first rectifier bridge comprising thyristors and connected to a first series of star-connected armature windings of the alternator and a second rectifier bridge comprising thyristors connected to a second series of delta-connected armature windings of the alternator, the two rectifier bridges being connected in parallel to the said load, and a circuit for firing the thyristors of the said rectifier bridges, which circuit is controlled by a measuring circuit directly connected to at least a part of the said armature windings of the alternator.

2. Apparatus according to claim 1, intended to produce a disruptive discharge in the said load, wherein said load comprises electrodes immersed in a conductive medium, and further comprising voltage step-up transformer means connected between the armature windings of the alternator and the said rectifier bridges.

3. Apparatus according to claim 1 intended to produce a current pulse in the said load, wherein said load comprises electrodes immersed in a conductive medium, and said alternator comprises an exciter winding connected in series with a rectifier to the input of at least one of the said rectifier bridges through a rectifier-transformer unit.

4. Apparatus according to claim 1, wherein said measuring circuit comprises a measuring rectifier bridge whose output is connected to a voltage divider connected to one of the inputs of a comparator, the other input of which is connected to a reference potential source, the said comparator being capable of supplying signals for rendering conductive the circuit controlling the firing of the thyristors of the said rectifier bridges.

5. Apparatus according to claim 3, wherein output of the said comparator is in addition connected through a variable-delay circuit to a member controlling the trigger of a thyristor connected in parallel with the load consisting of the said electrodes.

6. Apparatus according to claim 4, wherein the output of the said variable-delay circuit is connected through a delay circuit to the trigger of a controllable-conduction rectifier whose anode is connected to one electrode of a capacitor, the other electrode of which is connected to the anode of the thyristor connected in the circuit of the exciter winding in such manner as to render the latter nonconductive by inverse voltage by discharge when the said controllable-conduction rectifier is rendered conductive.

7. Apparatus according to claim 5 further comprising a feed circuit operated by discharge of a capacitor for feeding the exciter winding in the pre-excitation of the alternator.

* * * * *